E. H. METCALF.
Improvement in Cotton-Seed Planters.
No. 130,521. Patented Aug. 13, 1872.
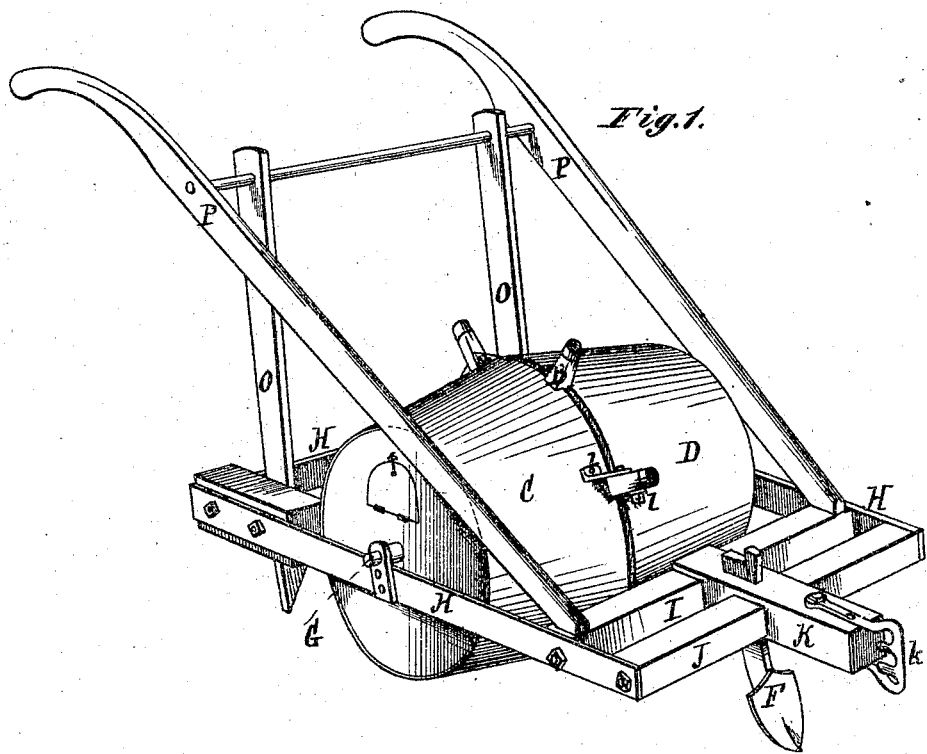
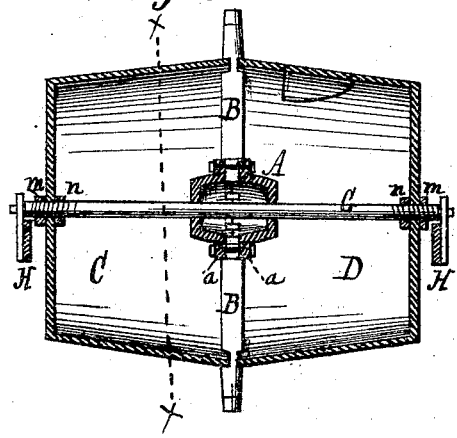
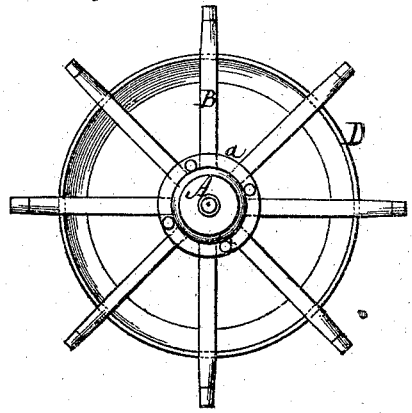
Witnesses.
H. L. Perrine
Wm. Howard
Inventor.
E. H. Metcalf,
by E. R. Brown,
Attorney.

UNITED STATES PATENT OFFICE.

ELIPHALET H. METCALF, OF MONTGOMERY, ALABAMA.

IMPROVEMENT IN COTTON-SEED PLANTERS.

Specification forming part of Letters Patent No. 130,521, dated August 13, 1872.

SPECIFICATION.

*To all whom it may concern:*

Be it known that I, ELIPHALET H. METCALF, of Montgomery, in the county of Montgomery and State of Alabama, have invented a new and useful Improved Cotton-Seed Planter; and I do hereby declare that the following is a full, clear, and exact description thereof sufficient to enable those skilled in the art to which my invention appertains to make and use the same, reference being had to the accompanying drawing making part of this specification, and to the letters and figures marked thereon.

The nature of my invention consists in a hub provided with axles and radial spokes, and surrounded by a casing for holding and distributing the seed, the whole being attached to a frame-work provided with handles for guiding, and beam and clevis for drawing the machine.

In the accompanying drawing, Figure 1 is a perspective view of my invention. Fig. 2 is a longitudinal sectional view of the casing, hub, and axles. Fig. 3 is a transverse section taken in the line $x\ x$, Fig. 1.

A represents a hub, which may be made of wood or metal, either hollow or solid. I prefer to cast it in two hollow sections, each provided with flanges $a$, by means of which the parts may be secured together by rivets or bolts and nuts, as shown in Figs. 2 and 3. The axle G may run entirely through the hub; or it may be formed in two parts, each part cast with or attached to one of the sections of the hub. The hub A is provided with a suitable number of mortises or recesses, in which are inserted the inner ends of spokes B, which may be tenoned for the purpose. The spokes radiate from the hub and extend a few inches beyond the periphery of the casing, and their outer ends may be provided with ferrules to protect them from wear. The casing or receptacle and distributer for the seed is made in two sections, C D, and, when secured together, resembles a barrel in shape—that is to say, the circumference is greater midway of its length than at the ends. The sections may be made of cast-iron, or the ends of iron and the sides of wood, hooped like a barrel or tub, as may be desired. The ends are perforated to allow the axle to protrude, as shown in Figs. 1 and 2. The sections C D may be held in place, and the width of the space between them regulated, by the means shown in Fig. 1 or the means shown in Fig. 2, either or both, as may be desired. In Fig. 1 the means shown consists of a bar, $l$, the inner end of which is bolted to the casing, and the outer portion is inclined toward the spokes, and has a longitudinal slot formed in it which engages with a set-screw on the spoke. When this means is employed one bar is attached to the section C and engages with a set-screw on one side of the spoke, and another bar is attached to the section D, engaging with a set-screw on the opposite side of the same spoke; and the bars may be connected with all the spokes, or only with alternate ones, as may be preferred. In Fig. 2 the means shown consist in simply forming a screw-thread near the ends of the axle G, on the portions which pass through the ends of the casing, and having at each end a nut, $n$, on the inside, and a nut, $m$, on the outside of the casing, by which means the width of the opening is readily adjusted. The edges of the sections C D have recesses formed in them at the points where the spokes protrude, which, engaging with the spokes, preserve the steadiness of the casing and insure its rotation. The ends of the axles G are journaled in a metallic bar, H, which forms three sides of the rectangular frame to which the apparatus is attached, the fourth side or forward portion being formed of two wooden bars, I J, to which the ends of the bar H are secured by rods which run entirely through them, and are fastened with nuts. To the bars I J is secured the beam K, on the front end of which is a clevis, $k$. A drill, share, or cultivator-tooth, F, works in a mortise in the beam K, between the bars I J, and is held in place and adjusted vertically by a key, set-screw, or other suitable means. At the two rear corners of the frame two blocks are bolted, and assist in supporting two bars, O, which extend downward from a rod which connects the upper portion of the handles P. To the lower ends of the bars O is attached the coverer, which may be of any suitable construction. The casing is provided with a door at the end for introducing the seed, and another at the top or side, allowing access to the seed for stirring when necessary.

As the machine is drawn along the casing revolves, the spokes entering the ground in the furrow made by the drill or share, and the seed passing through the opening between the sections, and entering the furrow with unerring precision.

When desired the frame may be made large enough to carry two of the machines—one for seed and the other for guano—as it is found to work very satisfactorily as a guano distributer; or the same machine may be used for both guano and seed.

Having thus described my invention, what I claim as new, and desire to secure by Letters Patent, is—

The hub A, formed with the flanges $a$, in combination with the axle G, spokes B, and casing C D, when constructed and arranged as herein shown and described.

E. H. METCALF.

Witnesses:
E. R. BROWN,
WM. G. HENDERSON.